C. W. TAYLOR.
POWER TRANSMISSION.
APPLICATION FILED MAY 26, 1911.
1,043,372.
Patented Nov. 5, 1912.
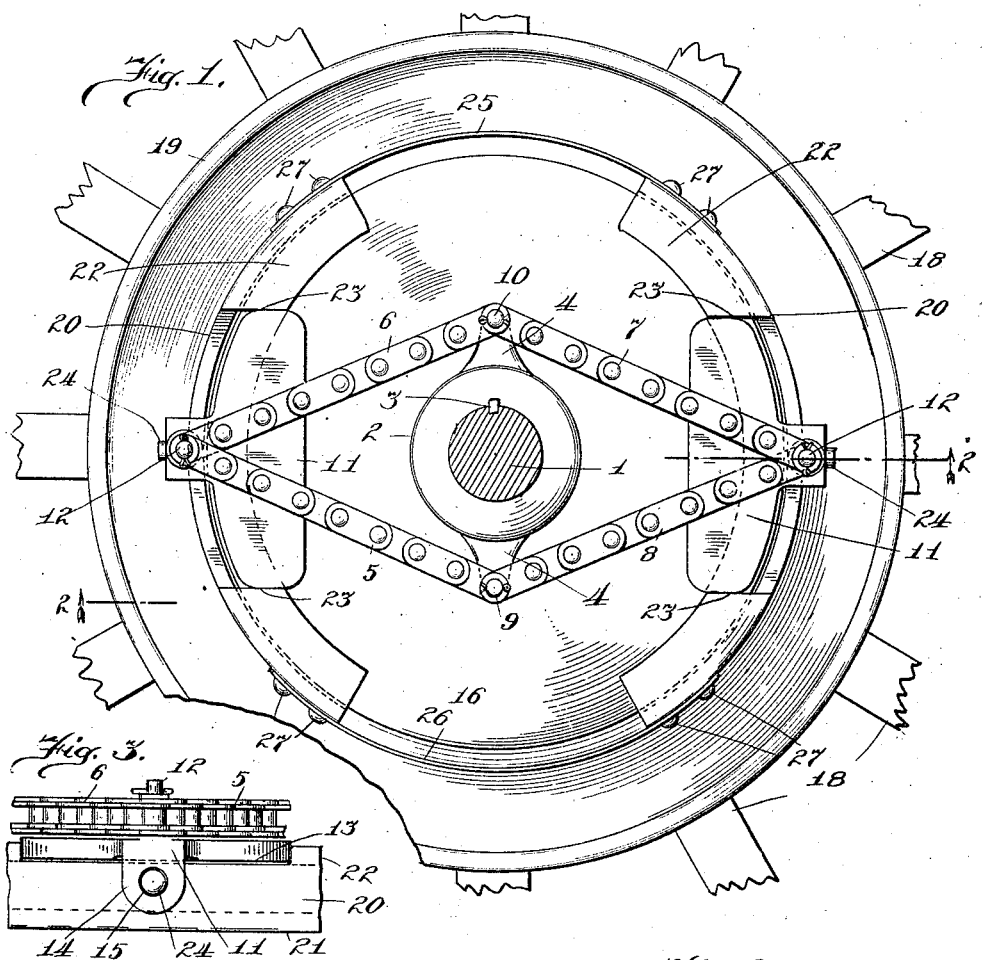
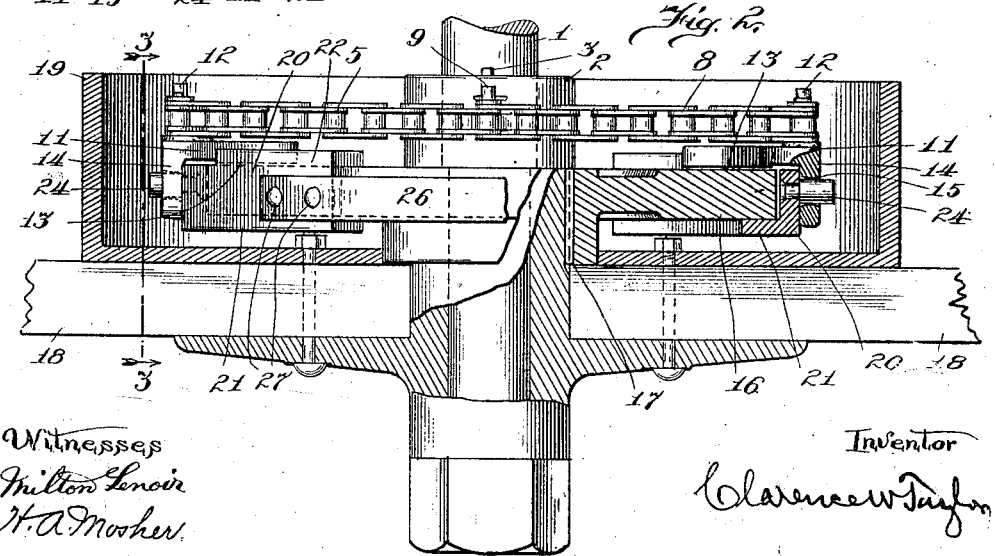
Witnesses
Milton Lenoir
H. A. Mosher
Inventor
Clarence W. Taylor

UNITED STATES PATENT OFFICE.

CLARENCE W. TAYLOR, OF CHICAGO, ILLINOIS.

POWER TRANSMISSION.

1,043,372.  Specification of Letters Patent.  Patented Nov. 5, 1912.

Application filed May 26, 1911. Serial No. 629,587.

*To all whom it may concern:*

Be it known that I, CLARENCE W. TAYLOR, a citizen of the United States, residing at Chicago, in the county of Cook and State of Illinois, have invented certain new and useful Improvements in Power Transmission, of which the following is a specification.

My invention relates to improvements in power transmission, and the primary object of my improvement is to afford mechanism for prompt and effective engagement and instant release between a driving and a driven member to actuate the driven member in either direction and to permit the driven member to independently disengage and revolve faster than the driving member in either direction.

Another object of my invention is to provide simple means to facilitate instant release of grapple or clutch means when the speed of the driven member for any reason becomes greater than that of the driving member.

A further object of my present improvement is a construction adapted for a wide scope of employment, and particularly of service in motor vehicles whether on the adjacent ends of a divided counter shaft of a double chain drive, or divided rear axle or near the outer ends of an axle with traction wheels loosely journaled thereon.

I attain the foregoing and other objects by the mechanism illustrated in the accompanying drawings, in which—

Figure 1 is a cross sectional view with my improvement in end elevation as applied to a rotatable shaft with a vehicle loosely journaled on the shaft. Fig. 2 is a vertical section partly in elevation of Fig. 1. Fig. 3 is a detail on line 3—3 of Fig. 2.

Similar numerals refer to similar parts throughout the several views.

While the general from illustrated in the preferred embodiment is of the metal to metal, dry plate type, my invention is efficient when run in oil. The gripping or engaging surfaces may be faced with leather, vulcanized fiber or other material to secure a high coefficient of friction if desired.

Referring to the drawings by reference numerals 1 designates a revoluble shaft or axle having a collar 2, keyed thereon at 3. The collar is provided with oppositely projecting lugs 4, which are adapted for engagement with one end of the respective links 5, 6, 7 and 8, by means of pins 9 and 10.

For the purpose of pinching or longitudinally gripping what is termed a driven member hereinafter mentioned, I have provided lever means 11, each having a stud 13 for link engagement, a bearing portion 12, and an apertured lug 14, with aperture 15, all of which will be more fully set forth.

The driven member 16 is keyed at 17 to a vehicle wheel having spokes 18 and carrying the customary brake-band 19. The driven member carries what is termed a grapple preferably for ordinary work composed of two parts 20, each having an outer inwardly projecting flange 21, and an inner inwardly extending flange 22 of less dimensions and being cut away at 23 to accommodate the bearing portion 13, of the pinching means 11. To form a pivot for the lug 14 there is provided a stud 24 which may be integral with or attached to the part 20 of the grapple.

For the purpose of facilitating quick release of the grapple and the pinching means 11 there is employed comparatively thin elastic blades 25 and 26 respectively to secure together the opposing ends of the two parts of the grapple. These blades, as stated, are elastic and when the grapple is assembled these blades are flexed sufficiently to describe arcs of a circle and fastened by rivets 27 or other means, and they constantly urge the grapple parts 20 apart, but when force is applied to contract the parts of the grapple these blades yield to permit either one or both parts to move slightly inwardly in cases where by construction or continued wear the arcs of the driven member and bearing surface of the grapple parts have different radii.

The lever means 11 is adapted to exert pressure against the driven member and to pull the flange 21 against the adjacent face of the driven member. The lever or pressure means acts in conjunction with the grapple to lock in driving relation the driven member and thereby radial and longitudinal contraction is effected.

In practice when the shaft 1 is rotated in a forward direction the links 6 and 7 will cause the two parts of the grapple to move toward each other and the pressure means 11 to effect a pinching of the periphery of the driven member 16 which will continue so long as the driving member is revolving at a greater speed than the driven member 16. When this particular vehicle wheel becomes the outer wheel or the wheel describing a longer radius curve in turning a corner, then the driven member and its vehicle wheel will automatically be released by the driven member running enough faster to straighten the links and the lever or pressure means to normal condition of no power being transmitted therethrough, when the vehicle wheel will be permitted to rotate freely. When the rates of speed of the driving and the driven members are in favor of the driving member power transmitting relation of the grapple and pinching means with the driven member in the same direction will again be established. The foregoing is true when the vehicle is moving in either direction.

It will be noted that the elastic blades facilitate prompt release of the grapple and the pinching means. These blades may be omitted and effective work will be done without them.

Various changes and modifications in the details of the invention, within the scope of the claims, may be resorted to without departing from the principle or sacrificing any of the advantages thereof, and I do not desire to be limited to exact construction shown and described of the preferred embodiment.

Anything shown and described but not claimed in this application is claimed in my copending application Serial No. 627063.

Having thus fully described my invention, what I claim as new and desire to secure by Letters Patent, is:

1. In a power transmission, the combination with a driving member and a driven member, of a grapple having a plurality of parts, the respective ends of said parts being secured together by elastic blades to facilitate prompt release of the grapple from the driven member, pressure means carried by the grapple, and a plurality of pairs of links each pair of links having their respective inner ends attached to the driving member at points diametrically opposite each other, and the outer ends of each of said pairs of links being in operative engagement with one of said pressure means.

2. In a power transmission, the combination with a driving member and a driven member, of a grapple having a plurality of segments, elastic blades fixed to form arcs of the grapple circle, and spanning the intervening spaces between the opposing ends of the segments, a plurality of pairs of links having their respective inner ends attached to the driving members at points diametrically opposite each other and the outer ends of each of said pairs of links being in operative engagement with a segment of the grapple.

3. In a power transmission, in combination with a driven member, a grapple having a plurality of segments, and elastic blades flexed to form arcs of the grapple circle and spanning the intervening space between the opposing ends of the segments.

In testimony whereof, I affix my signature in the presence of two witnesses.

CLARENCE W. TAYLOR. [L. S.]

Witnesses:
 H. A. MOSHER,
 H. A. METCALF.